United States Patent
Roscoe et al.

(10) Patent No.: US 9,712,966 B2
(45) Date of Patent: *Jul. 18, 2017

(54) APPARATUS, METHOD AND PROCESS OF INFLUENCING INFORMATION GATHERED BY A TETHERED ITEM AND COMPUTER-READABLE MEDIUM THEREOF

(71) Applicant: ADFLOW NETWORKS INC., Burlington (CA)

(72) Inventors: David M. Roscoe, Burlington (CA); Mike Abbott, Dundas (CA); Tomasz Duczmal, Carp (CA)

(73) Assignee: ADFLOW NETWORKS INC., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,969

(22) Filed: Jul. 26, 2016

(65) Prior Publication Data

US 2016/0337791 A1   Nov. 17, 2016

Related U.S. Application Data

(63) Continuation of application No. 14/842,439, filed on Sep. 1, 2015, now Pat. No. 9,432,812, which is a
(Continued)

(51) Int. Cl.
*G06F 17/30* (2006.01)
*H04W 4/02* (2009.01)
(Continued)

(52) U.S. Cl.
CPC .............. *H04W 4/021* (2013.01); *G06F 3/00* (2013.01); *G06F 3/0635* (2013.01); *G06F 13/10* (2013.01);
(Continued)

(58) Field of Classification Search
CPC .............. G06F 21/60; G06F 17/30017; G06F 17/30368; G06F 17/3082; G06F 17/30073;
(Continued)

(56) References Cited

U.S. PATENT DOCUMENTS 5,608,449 A   3/1997 Swafford, Jr. et al.
6,038,545 A   3/2000 Mandeberg et al.
(Continued)

FOREIGN PATENT DOCUMENTS

| WO | WO 01/65411 A1 | 9/2001 |
|---|---|---|
| WO | 2009-032772 | 3/2009 |
| WO | WO 2009/149312 A1 | 12/2009 |

OTHER PUBLICATIONS

Extended European Search Report dated Jun. 16, 2015 in related European Patent Application No. 12856335.0 (9 pages).
(Continued)

*Primary Examiner* — Henry Tsai
*Assistant Examiner* — John Roche
(74) *Attorney, Agent, or Firm* — Staas & Halsey LLP (57) ABSTRACT

A tethered item is associated with an identifier that uniquely identifies the item, and one or more content processing devices execute obtaining an identifier of the item, and correlating the obtained item identifier with information related to the tethered item.

16 Claims, 8 Drawing Sheets

Related U.S. Application Data continuation of application No. 13/313,425, filed on Dec. 7, 2011, now Pat. No. 9,152,986.

(51) Int. Cl.

| | | |
|---|---|---|
| *G06F 13/10* | (2006.01) | |
| *G06F 3/06* | (2006.01) | |
| *G06F 13/38* | (2006.01) | |
| *G06F 3/00* | (2006.01) | |
| *G06Q 30/02* | (2012.01) | |
| *G07G 1/00* | (2006.01) | |
| *H04L 29/08* | (2006.01) | |
| *H04W 88/02* | (2009.01) | |

(52) U.S. Cl.
CPC .......... *G06F 13/385* (2013.01); *G06F 13/387* (2013.01); *G06F 17/3087* (2013.01); *G06F 17/30241* (2013.01); *G06Q 30/0238* (2013.01); *G06Q 30/0268* (2013.01); *G06Q 30/0281* (2013.01); *G07G 1/0081* (2013.01); *H04L 67/24* (2013.01); *H04L 67/306* (2013.01); *H04W 4/025* (2013.01); *H04W 88/02* (2013.01)

(58) Field of Classification Search
CPC ......... G06F 17/30265; G06F 17/30312; G06F 21/30; G06F 21/31; H04L 12/2809; H04L 12/2818; H04L 2012/2841; H04L 2012/2843; H04L 67/025
See application file for complete search history.

(56) References Cited

U.S. PATENT DOCUMENTS

| | | | |
|---|---|---|---|
| 6,154,738 | A | 11/2000 | Call |
| 6,807,574 | B1 | 10/2004 | Partovi et al. |
| 6,957,393 | B2 | 10/2005 | Fano |
| 6,976,006 | B1 | 12/2005 | Verma et al. |
| 6,985,742 | B1 | 1/2006 | Giniger et al. |
| 7,069,238 | B2 | 6/2006 | I'Anson et al. |
| 7,280,823 | B2 | 10/2007 | Ternullo et al. |
| 7,374,258 | B2 | 5/2008 | Bowron |
| 7,398,470 | B2 | 7/2008 | Keane |
| 7,533,334 | B2 | 5/2009 | Atkin et al. |
| 7,667,601 | B2 | 2/2010 | Rabinowitz et al. |
| 7,676,035 | B2 | 3/2010 | Werth et al. |
| 7,694,876 | B2 | 4/2010 | Barnes et al. |
| 7,699,703 | B2 | 4/2010 | Muir et al. |
| 7,701,339 | B2 | 4/2010 | Irmscher et al. |
| 7,705,732 | B2 | 4/2010 | Bishop et al. |
| 7,724,135 | B2 | 5/2010 | Rapp et al. |
| 7,830,259 | B2 | 11/2010 | Walker et al. |
| 9,152,986 | B2 * | 10/2015 | Roscoe .............. G06Q 30/0281 |
| 2002/0054350 | A1 | 5/2002 | Kakigi et al. |
| 2003/0074267 | A1 | 4/2003 | Acharya et al. |
| 2003/0132298 | A1 | 7/2003 | Swartz et al. |
| 2004/0019535 | A1 | 1/2004 | Perkowski |
| 2005/0119946 | A1 | 6/2005 | Cakiral |
| 2005/0251456 | A1 | 11/2005 | Perkowski |
| 2007/0080805 | A1 | 4/2007 | Franklin et al. |
| 2007/0194918 | A1 | 8/2007 | Rabinowitz et al. |
| 2008/0091552 | A1 | 4/2008 | Aas |
| 2008/0284566 | A1 | 11/2008 | Zai et al. |
| 2008/0309456 | A1 | 12/2008 | Liu |
| 2009/0039165 | A1 | 2/2009 | Collins et al. |
| 2009/0077624 | A1 | 3/2009 | Baum et al. |
| 2009/0077841 | A1 | 3/2009 | Ngo et al. |
| 2009/0100530 | A1 | 4/2009 | Chen |
| 2009/0106261 | A1 | 4/2009 | Nagasaka et al. |
| 2009/0182630 | A1 | 7/2009 | Otto et al. |
| 2009/0229089 | A1 | 9/2009 | Galant |
| 2010/0057612 | A1 | 3/2010 | Wagenhals |
| 2010/0188222 | A1 | 7/2010 | Irmscher et al. |
| 2010/0188223 | A1 | 7/2010 | Irmscher et al. |
| 2010/0318699 | A1 | 12/2010 | Gao-Saari et al. |
| 2011/0241870 | A1 | 10/2011 | Irmscher et al. |
| 2011/0288938 | A1 | 11/2011 | Cook et al. |
| 2016/0036588 | A1 * | 2/2016 | Thackston .............. H04L 9/321 713/168 |

OTHER PUBLICATIONS

Form PCT/IB/326 and Form PCT/IB/373, Notification of Transmittal of International Preliminary Report on Patentability (IPRP) on Jun. 19, 2014, including the IPRP dated Jun. 10, 2014, in corresponding International Application No. PCT/US2012/068192 (7 pages).

PCT International Search Report and Written Opinion of the ISA, PCT Forms PCT/ISA/220, PCT/ISA/210 and PCT/ISA/237, mailed Feb. 25, 2013, in corresponding International Patent Application No. PCT/2012/68192 (13 pages).

Non-Final Office Action dated May 10, 2013 in co-pending U.S. Appl. No. 13/313,425 (16 pages).

Final Office Action dated Jan. 30, 2014 in co-pending U.S. Appl. No. 13/313,425 (15 pages).

Advisory Action dated Apr. 10, 2014 in co-pending U.S. Appl. No. 13/313,425 (3 pages).

Non-Final Office Action dated Jun. 20, 2014 in co-pending U.S. Appl. No. 13/313,425 (17 pages).

Final Office Action dated Mar. 16, 2015 in co-pending U.S. Appl. No. 13/313,425 (18 pages).

Notice of Allowance mailed Jul. 7, 2015 in co-pending U.S. Appl. No. 13/313,425 (10 pages).

Non-Final Office Action dated Dec. 18, 2015 in co-pending U.S. Appl. No. 14/842,439 (32 pages).

Notice of Allowance mailed Apr. 26, 2016 in co-pending U.S. Appl. No. 14/842,439 (16 pages).

U.S. Appl. No. 13/313,425, filed Dec. 7, 2011, David M. Roscoe et al., Adflow Networks Inc. Burlington, ON, CA.

U.S. Appl. No. 14/842,439, Sep. 1, 2015 David M. Roscoe et al., Adflow Networks Inc. Burlington, ON, CA.

European Examination Report dated Feb. 24, 2017 in related European Patent Application No. 12856335.0 (8 pages).

U.S. Appl. No. 14/842,439, Sep. 1, 2015, Roscoe et al., Adflow Networks Inc. Burlington, (CA).

U.S. Appl. No. 13/313,425, Dec. 7, 2011 Roscoe et al. Adflow Networks Inc. Burlington, (CA).

* cited by examiner

TABLE DEFINITION

| | FIELD | FIELD TYPE | FIELD LENGTH | FIELD ALIAS |
|---|---|---|---|---|
| 131a | TARGET DEVICE ID | ... | ... | ... |
| 131b | BRANDNAME 95 | ... | ... | ... |
| 131c | SERIAL NO. | | | |
| 131n | MODEL NO. | | | |
| 133 | VERSION ID | | | |
| 135 | INFORMATION | | | |

FIG. 3A

| TARGET DEVICE ID | TARGET POSITION ID (E.G., COUNTRY, STATE, ZIP CODE, COMPANY, STORE/ BUILDING INFORMATION, LOCATION (AREA) INFORMATION) | INFORMATION (E.G., ADDITIONAL, ADVERTISEMENT, PROMOTIONAL INFORMATION, OPERATION MANUAL, UPDATE INFORMATION), AND/OR INFORMATION ID (142) | VERSION ID |
|---|---|---|---|
| BRANDNAME 95 | | | |
| 1112 (ID NUMBER) | | | |
| 1112-2223 (ID NUMBER) | | | |
| SERIAL NO. | | | |
| MODEL NO. | | | |

APPARATUS, METHOD AND PROCESS OF INFLUENCING INFORMATION GATHERED BY A TETHERED ITEM AND COMPUTER-READABLE MEDIUM THEREOF

CROSS-REFERENCE TO RELATED APPLICATION

This is a continuation application of U.S. patent application Ser. No. 14/842,439, filed on Sep. 1, 2015, which is a continuation application of U.S. patent application Ser. No. 13/313,425 (now U.S. Pat. No. 9,152,986), filed on Dec. 7, 2011, the entire contents of which are incorporated herein by reference.

FIELD

Example embodiments relate to output of information related to an item, such as a processing device and influenced by presence of the item.

BACKGROUND

As an example, the cellular telephone industry includes constantly changing handset models, prices and promotions. Handset makers and service providers in this industry engage in very fierce competition requiring many marketing and advertising campaigns. Because of the constant changes in the industry, sales and promotion of handsets is encumbered and presents a number of challenges.

Electronic kiosks are devices designed for specific uses and are used broadly for unattended self-service use as a promotional and/or educational device. The kiosks have items to be promoted on display for demonstration purposes and the items are attached to the kiosk. The information displayed on the kiosk relating to a promotional item plays an important role in the education of potential customers outlining the features and advantages of the promotional item. Such information allows the customer to test the item and gather information relevant to his/hers individual needs. The kiosk allows for making quick comparisons using touch and drag and drop capability which fills areas on a touch screen allowing comparisons between different models or products. This functionality is gaining popularity with vendors and customers.

The maintenance and servicing of the content relating to the promotional items presented on these kiosks such as cellular handsets represents a challenge to vendors/retailers and service technicians as the multiplicity of models, locations, marketing campaigns and continuous introduction of new units creates a large number of possible permutations. The update process is prone to errors and potential mismatch of promotion material to items promoted on the kiosk.

It would be an advancement in the art to overcome these limitations.

SUMMARY

According to an aspect of an embodiment, an item, such as a device tethered to a place or an apparatus, for example at a station or a kiosk, is associated with an identifier that uniquely identifies the tethered device, and one or more content processing devices, for example computer implemented content controllers execute obtaining an identifier of the device, correlating the obtained device identifier with information related to the device, for example information or content that is one or more of additional, promotional, advertisement, help, operational/specification, educational, version, security, for the device, and controlling output of the information for the device.

The foregoing and/or other aspects are further achieved by a tethered device being associated with an identifier that uniquely identifies the device, and one or more computer implemented content controllers to execute obtaining an identifier of a device, correlating a received identifier of a device with first information, for example promotional information, for the device, and controlling output (e.g., play of a first promotional information on a display) if received identifier of a device is correlateable with first information, and optionally output (e.g., play of a second information on a display) if received identifier of a device is not correlateable with first information.

The foregoing and/or other aspects are further achieved, for example, by providing a kiosk, including an assembly or mechanism to tether one or more identifiable devices to the kiosk and a communication link to a content controller to identify the devices.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. Embodiments are described below to explain the present disclosure by referring to the figures.

Figure 1A:
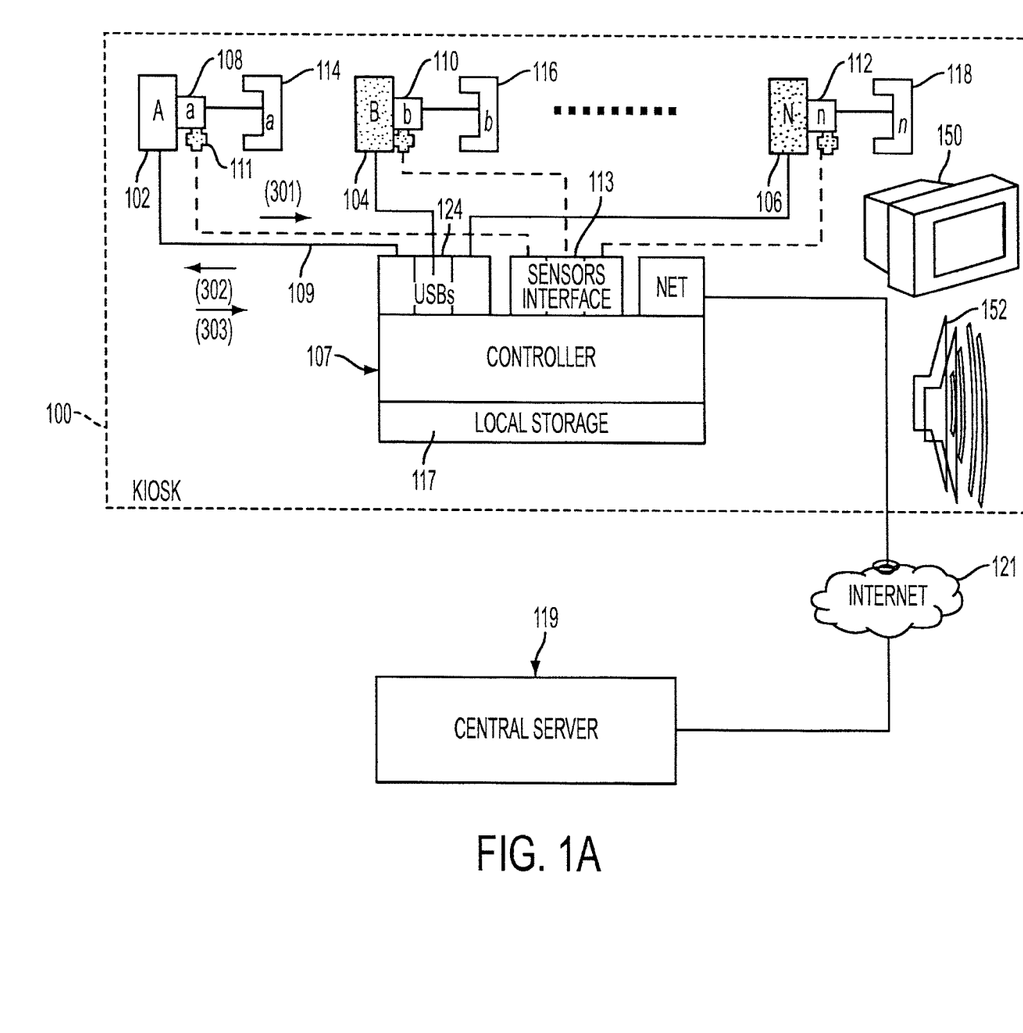
FIGS. 1A and 1B are schematic diagrams of a networked apparatus according to example embodiments.
Figure 1B:
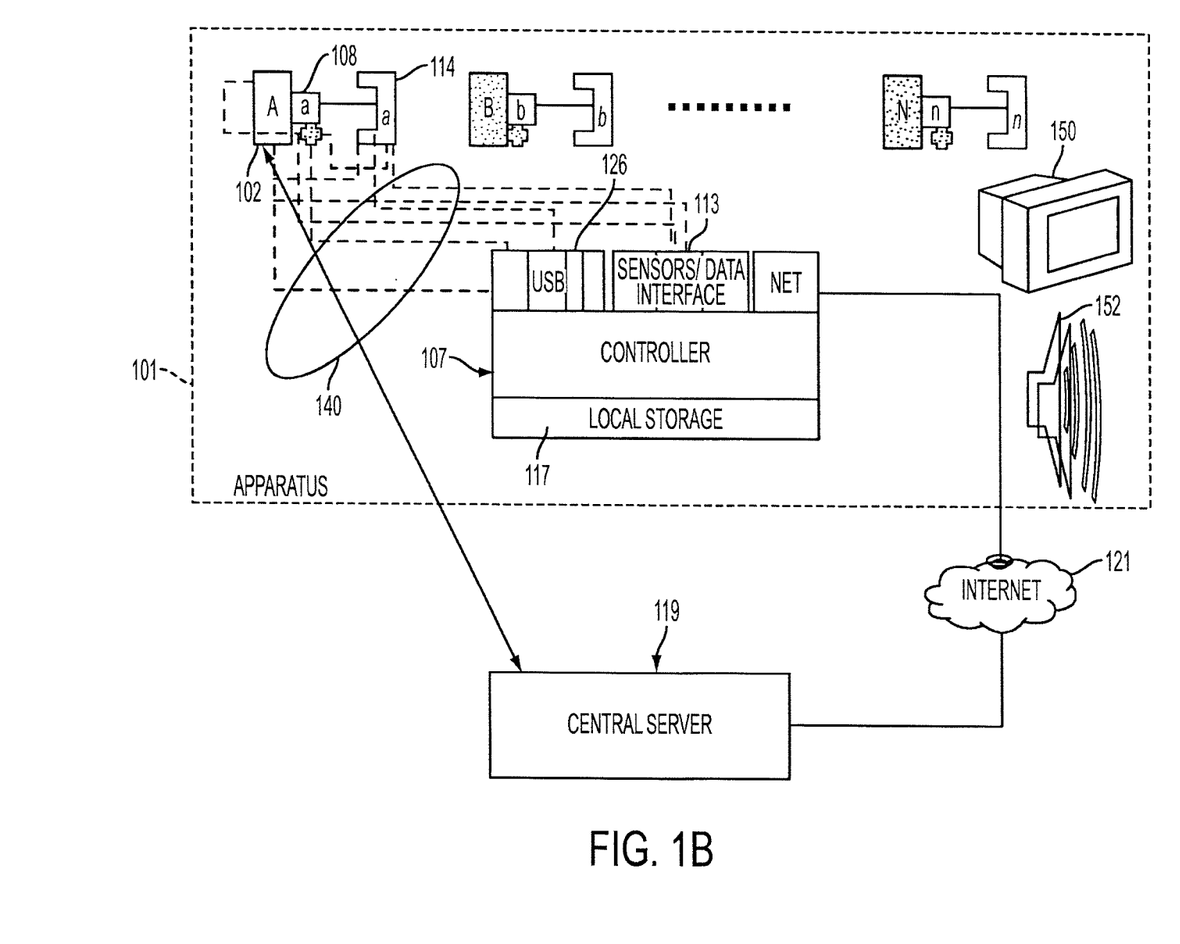

FIGS. 1A and 1B are diagrams of a networked apparatus, according to embodiments of the present invention. Example embodiments relate to an apparatus, system and method to output information relating to (about or in connection with) an item, such as a processing device 102 as influenced by physical presence of the processing device 102 in an area by way of identifying the processing device 102 at a physical location, thereby providing device presence sensitive information relating to the device. According to an aspect of an embodiment, information is influenced based upon a tethered item, such as a tethered processing device. According to an aspect of an embodiment, an apparatus, method and process of influencing information gathered by or for a tethered item and computer readable medium thereof is provided. According to an aspect of an embodiment, output of content is dynamically influenced based on presence of a processing device 102. According to an aspect of an embodiment, output of content is dynamically influenced based on presence of a processing device 102 and an event in connection with presence of the processing device 102. According to an aspect of an embodiment, an apparatus has a content processing device; and a tethered processing device (a target tethered processing device) associated with an identifier (ID), to uniquely identify the target device and presence of the target device to the content processing device, wherein the content processing device is configured to execute, in response to an event obtaining the target device identifier, retrieving information correlated with the obtained target device ID; and outputting the information. A method of providing information for a target device tethered to an apparatus by configuring a computer implemented content controller to detect an event in connection with presence of the target device and a user, obtaining an identifier (ID) of the target device in response to the event, retrieving information correlated with the obtained target device ID, and outputting the information. The event in combination with target device ID is indicative of physical presence of the target device, for example near or in close proximity to the apparatus or at a location. In addition, a position ID in combination with the event and target device ID is indicative of a physical presence and a specific location of the target device. According to an aspect of an embodiment, a method of influencing content playback based upon identification of a tethered device is provided.

According to an aspect of an embodiment, a processing device 102 is tethered, where the tether 108 can be a physical tether connected by a cable to an apparatus or cradle 114 that is attached to an apparatus and/or a virtual (wireless signaling/data communication) tether that signals an event to a receiver when the processing device 102 is located a distance from the receiver (e.g., sensors interface 113) that is in wireless communication with the virtual tether. A tethered processing device may be retailed or vended. The tethered processing device may be tethered to an apparatus, for example at a kiosk, a station or booth 100. A kiosk 100 may be a fixture, a computer implemented media player, an enclosed structure (e.g., an enclosed apparatus, a booth with open sides or windows, a room) and/or an open structure (e.g., a place, a station, a table), with interactive (direct and/or indirect) user access to a tethered processing device 102. A kiosk 100 may be an electronic or computer kiosk including a processing control device 107 and configured to connect, interface, communicate with one or more of a display 150, a speaker 152, a microphone, other input/output device, and configured to communicate with a tethered device 102.

For example, in FIG. 1A, a kiosk 100 as an example of an apparatus is configured to output information, for example output promotional information at the kiosk, according to example embodiments of the present invention. According to an aspect of an embodiment, the kiosk 100 can output information to a remote terminal. According to an aspect of an embodiment, the output information by the kiosk is about or related to one or more target kiosk devices. Target kiosk devices 102, 104 and 106 may be securely mounted to holders (tethers) 108, 110 and 112 respectively. The holders 108, 110 and 112 may be mechanically connected to cradles 114, 116, and 118 respectively. The embodiments are discussed with reference to a target device 102, and a holder 108 and cradle 114 (according to an aspect of an embodiment any combination of a holder 108 and/or cradle 114 can be referred to as a tether).

The target devices 102, 104 and 106 is configured to be communicably connected to a computer implemented content controller 107 via one or more standard interfaces 109, for example, a Universal Serial Bus (USB) 124, wireless interface (e.g., BLUETOOTH), to provide a target device ID 131 (see FIGS. 3A, 3B) for the content controller 107. For example, the content controller 107 is local at or near/intra (intranet) an area of the kiosk 100. A holder 108 may also include a sensor 111 which is connected electrically and/or wirelessly to a sensors interface 113. The sensor 111 is a device for detecting one or more events (for example, a sensing device that responds to stimulus such as heat, light, sound, pressure, touch, magnetism, received signal, or a particular motion), in relation to the target device 102, for example, lifting of the target device from the cradle 114, a person approaching the target device 102, touching of the target device, the target device 102 nearing a threshold distance from the sensor 111. According to an aspect of an embodiment, the sensor receives a signal command from another device to trigger an event. The content controller 107 may include local storage 117 and is connected to a central server 119 via a standard internet connection 121.

As an example, an item or article, such as an electronic device, digital camera, and mobile GPS could be used as representative examples of a thing tethered, for example, a target tethered device 102 to be promoted as a promotional item. The example embodiments are not limited to these devices as examples of items, and other non-electronic items can be utilized. The example embodiments provide an unexpected benefit, namely a substantial reduction in a potential mismatch of promotional material for a target kiosk device 102 by correlating promotional information about a target device based upon a unique identifier associated with a target device. According to an aspect of an embodiment, information for a target device 102, such as additional, promotional information, can be maintained on a target device basis according to association of a unique identifier 131 with a target device 102 and correlation of the unique identifier 131 with (as a key to) information for the target device 102, where such information can be maintained current (updated) independently, dynamically, real-time, centrally (remotely in relation to a kiosk 100), locally near the kiosk 100, on a target device at a location/position of the target device basis.

According to example embodiments, the promotional kiosk 100 may include a display 150, and a speaker 152, where information output at the kiosk 100 concerning a target device 102 can be audio visual content.

The holder 108 may be movable and may rest in the cradle 114. The holder 108 may be attached to the kiosk 100 by an expandable, flexible cable type connection which can serve two purposes: 1) preventing the theft of the target device 102 and 2) supplying two electrical and logical connections between (a) the holder 108 and controller 107, as target device positional information, and (b) the target device 102 and controller 107, as target device identification information. The holder 108 may contain the sensor 111 and may be logically identifiable by the controller 107 as target device positional information. The target device 102 may be securely placed into the holder 108 and connected to the controller 107 via a standard interface 109 such as USB 124 and/or other wireless connection.

FIG. 1B is diagram of a networked apparatus 101 that is configured to output information in response to a detected trigger at one or more of the target device 102, the holder 108, the sensor 111, or the cradle 114, and transmission of the trigger signal to the content controller 107 over a data interface 140 configured among the target device 102, the holder 108, the sensor 111, or the cradle 114, and the content controller 107. In FIG. 1B, target device ID of a target device 102 is determinable according to one or more combinations of data communication among one or more of a target device 102, a holder 108, a sensor 111, a cradle 114, an interface 126 of a content controller 107, or a sensors interface 113 of the controller 107.

For example, the sensor 111, upon detecting an event, can request (e.g., via a USB interface) the target device ID from the target device 102 and transmit the target device ID along with the detected event information to the content controller 107. The sensor 111, the holder 108, the cradle 114 or the content controller 107, or the item, such as target device 102, may be configured to include a target device ID memory to store a target device ID upon a first or initial retrieval (or generation) of the target device ID from/for the target device 102, so that upon subsequent triggered events, stored target device ID and the event information is transmitted to the content controller 107. According to an aspect of an embodiment, the target device ID memory is configured to be resettable upon change of the target device 102, where upon the reset, a new target device ID of a new target device 102 is retrieved and stored in the target device ID memory. For example, according to an aspect of an embodiment, an item, such as a target device 102 is configured to, for example via an application interface on the target device 102, initiate and directly communicably connect (wire or wireless (local/near and/or cellular network)) to the content controller 107 or a remote server, such as central server 119, to be initialized with a target device ID and/or to provide a target device ID for the content controller 107. The sensor 111 may be attached directly to a target device 102. The target device ID memory may be an integrated circuit including memory and processing capabilities/functions to store, compute (e.g., generate IDs) and transceiver data.

For example, according to an aspect of an embodiment, a item/device identification (ID) 131 for a target tethered item, such as device 102 is determinable based upon one or more of retrieving the device ID 131 from an item, such as a target device 102, according to a computer implemented interface or function (e.g., USB, wireless, transponder (active or passive), such as Radio Frequency Identification (RFID) tag), between the content controller 107 and/or 119 and the target device 102, or an interface between the content controller 107 and/or 119 and an integrated circuit board including a memory and an application and/or user interface as attached to the item, such as the target device 102, that stores the target item/device ID, to securely retrieve the target item/device ID from the target item, in response to or triggered by an event in connection with the target tethered item, thereby the content controller 107 and/or 119 obtains the item/target device ID to influence information. In effect information gatherable by a tethered item is influenced in response to or triggered by an event in connection with the tethered device. The item or device ID 131a-c, . . . , n (see FIGS. 3A, 3B) retrieved from an item, such as a target device 102, can be a device serial number, model number, bar code, or other identifier that uniquely identifies an item for purposes of associating additional information with the item. A secure device ID retrieval from the target device can be according to a target device manufacturer security protocol.

According to an aspect of an embodiment, target device positional information is information about geographic and/or other area location (e.g., a building, a store, an area within a store) of a target device based upon correlation of tether identification with actual positional information of the tether. Positional information is predetermined and/or determinable, for example, via Global Positioning System (GPS), other location services or positioning technology, such as radio, ultrasound, infrared signal based positioning technology, for a tether.

Figure 2:
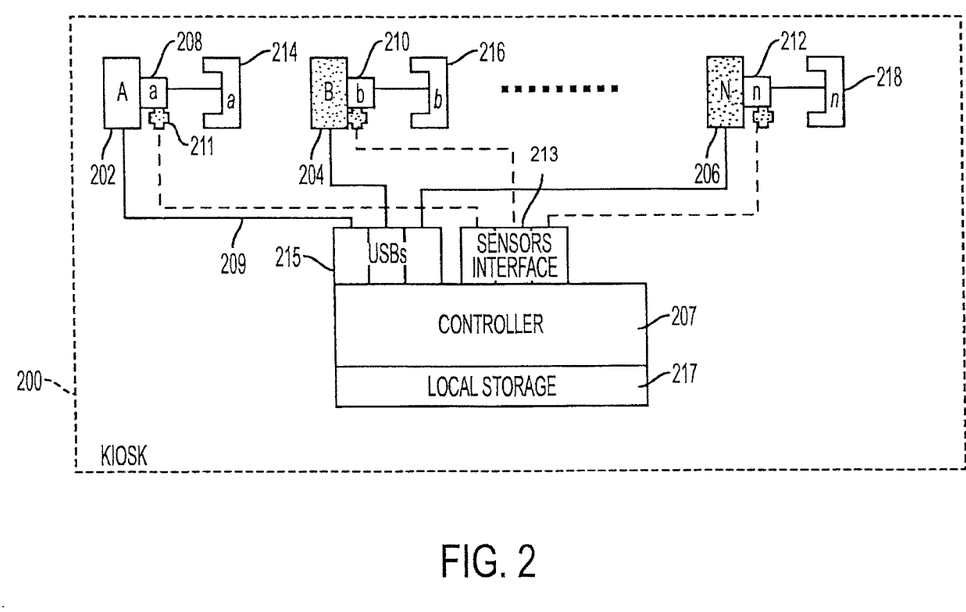
FIG. 2 illustrates a schematic diagram of an apparatus in a stand-alone configuration according to example embodiments.

FIG. 2 shows a schematic diagram of an apparatus, for example a kiosk 200, in a stand-alone configuration. Example devices 202, 204 and 206 may be securely mounted to respective holders 208, 210 and 212. The respective holders may be mechanically connected to cradles 214, 216 and 218. The devices 202, 204 and 206 may be electrically connected to a controller 207 via a standard interface 209. A holder 208 may also include a sensor 211 which is connected electrically to a sensors interface 213. In addition, each of the example devices 202, 204 and 206 may be connected to a USB interface 215. The controller may include local storage 217. However, as shown in FIG. 2, the example kiosk 200 may not be connected to a central server via a standard internet connection as shown in FIGS. 1A and 1B.

Figure 3A:
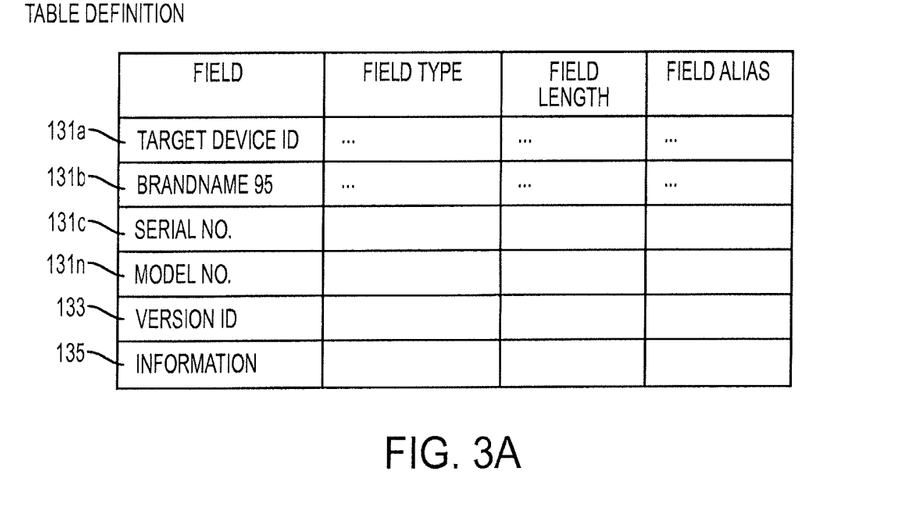
FIGS. 3A and 3B are diagrams of data structure of device identifier and information for the device, according to example embodiments.
Figure 3B:
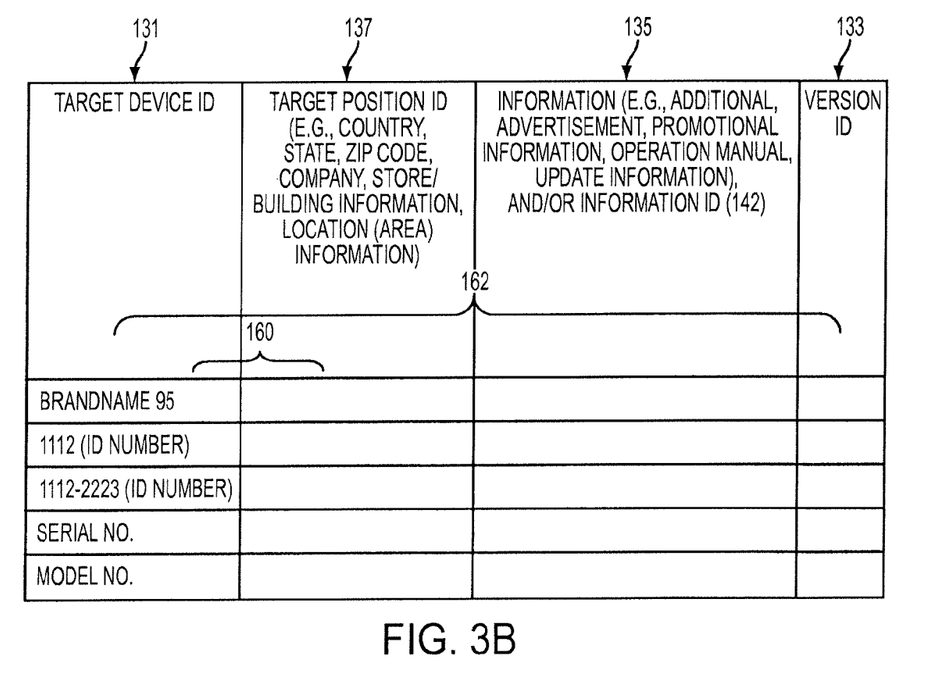

FIGS. 3A and 3B are diagrams of data structures of device identifier and information for the device, according to example embodiments of the present invention. FIG. 3A is data table structure for a target device 102 record, including one or more unique target device ID fields and an information field 135 for the target device 102 and attributes of the fields including type (number, text, etc.), length of field and alias information.

In FIG. 3B, according to an example view of data for a target device 102, for example in a database implementation, a target device ID 131 is associateable with target position ID 137, additional information 135 and version ID 133. The target device ID 131 includes information that uniquely identifies a target device 102, and can include one or more of an arbitrary ID number, a brand name, serial number, or model number assigned or provided for the target device 102. In addition, the target device ID 160 can include both a tethered device ID 131 and position information of a tether (target position ID 137). A target position ID 137 is information identifying a physical location of a target device 102, such as country, state, zip code, company, store/building or geographic location (area) information. The target position ID 137 and target device ID 131 may be utilized for collecting marketing data based upon triggered kiosk events on a target device 101 basis.

According to an aspect of an embodiment, a tethered device, for example tethered to an area, a place, a station, an apparatus, or a kiosk, is associated with an identifier that uniquely identifies the target device, and one or more content processing devices, for example computer implemented content controllers execute obtaining an identifier of the target device, correlating the obtained target device identifier with information related to the target device, for example information or content that is one or more of additional, promotional, help, operational/specification, educational, version, security, for the target device, and controlling output of the information for the target device. According to an aspect of an embodiment, an apparatus or area to which the target device is tethered, for example a kiosk, may be a personal guide which is attentive, on call all the time and delivers personalized information relating to a tethered device according to or in response to a user profile based event and filtering of information related to the target device that is associated with the target device ID.

In addition, a single key 162 may be provided or generated (e.g., at one or more of the target device 102, content controller 107, central sever 119) for a target device 102 that is a combination of target device ID 131, target position ID 137, information ID 142, version ID 133. A database can be implemented and stored in the content controller 107 and/or the central server 119.

Figure 4:
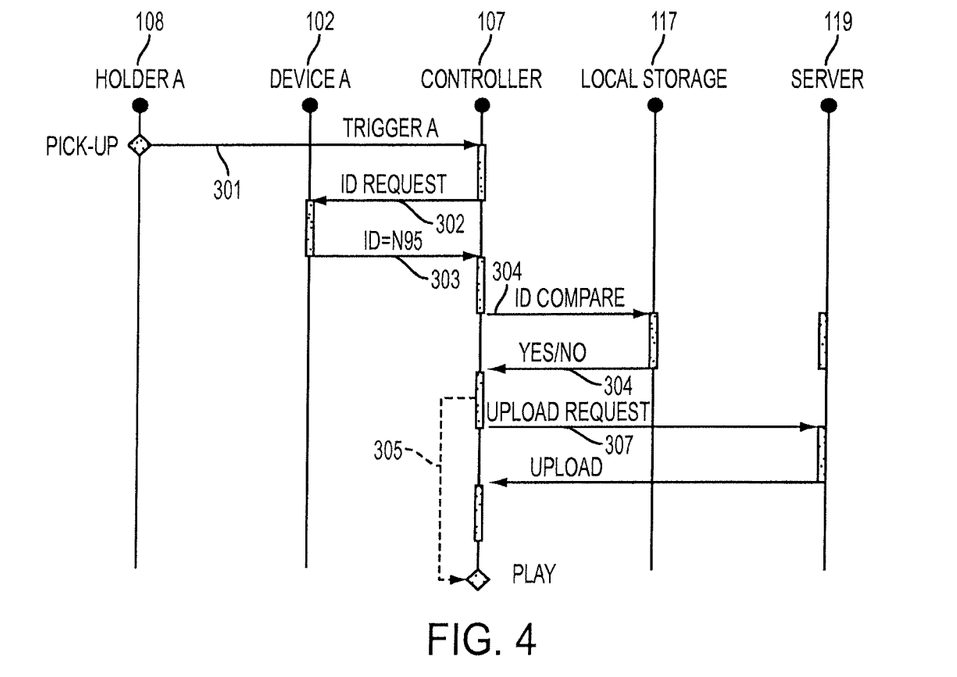
FIG. 4 shows a flow diagram for a networked apparatus according to example embodiments.

FIG. 4 is a diagram illustrating an example sequence of operations (see also FIG. 1) for a networked apparatus, according to an embodiment of the present invention. The vertical lines may represent points in time along a time line for the networked apparatus, for example, the kiosk 100, apparatus 101. The diamonds may represent main events and thick vertical lines may represent example processes taking place at the kiosk 100, apparatus 101. The arrows may represent signals sent from one component to another and may have associated logical meaning. The dotted line may represent an alternative process.

According to example embodiments, the controller 107 of the promotional kiosk 100 (apparatus 101) may be connected to the central server 119 via the network 121. In case of initial identification of the device 102 being held in the tether (e.g., holder 108), the following operations may occur when the electronic device 102 is connected to the kiosk controller 107 via an electrical connection:

In 301, the controller 107 may detect that the device 102 has been connected to it and determine which holder 108 is connecting to it. The controller 107 may also detect that a new device 102 has been connected in holder 108.

In 302, the controller 107 may request a device ID 131 of device 102. As an example, the controller 107 may send a request which initiates the device 102 in holder 108 to identify itself.

In 303, the device 102 in holder 108 may send the ID 131 of device 102 to the controller 107. As an example, the ID of the device may be "BRANDNAME 95."

The controller 107 may pull a version ID 133 of the promotional material version for "BRANDNAME N95" 131 from the server 119. The version ID 133 can be used to cache promotional material 135 in the content controller 107.

In 304, the controller 107 may check device ID 131 and/or a version of the promotional material 135 in its cache or local storage 117 using the version ID 133. If at 304 this device ID 131 is present at the local storage 117 and (as the case may be) the version is correct (Yes at 304), at 305 the controller 107 may associate the promotional material 135 with the target device 102 and make the promotional material 135 available for output, if not (No at 304), in 307 the controller 107 may download the promotional material 135 and/or a latest version of the promotional material 135 from the server 119, thereby forcing retrieval of correct additional information for a target device 102. If at 307, the device ID 131 and/or a correct version of the promotional material 135 cannot be determined, then at 305 the content controller 107 outputs default promotional material. According to an aspect of an embodiment, the target device 102 may store promotional material 135 to be downloaded and output by the content controller. Output of the promotional material 135 can be in any form of audio visual (motion, still) output.

Because the device 102 is logically connected to the controller 107, according to the above sequence of events a robust configuration is provided and the possibility of a mismatch between a device 102 and promotional material 135 is eliminated. This advantage is achieved by a unique and inventive design. As long as the logical connection between the electronic device 102 and the controller 107 may exist and the device ID 131 is issued (provided), there may be no possibility of mismatch between the promotional material 135 and the device 102 held in the holder 108, for example the "BRANDNAME 95."

According to example embodiments, when the electronic device 102 being held by the holder 108 is lifted from the cradle, the following sequence of events may also occur at 301-303.

In 301, the sensor 111 of the holder 108 may detect that the holder 108 has been lifted and may send a signal to the controller 107 with the logical meaning "holder 108 is active."

In 302, the controller 107 may respond with a signal to the device 102 held in the holder 108 which includes a request for the device 102 in holder 108 to identify itself.

In 303, the device 102 in holder 108 may send its ID 131 as "BRANDNAME 95."

Figure 5:
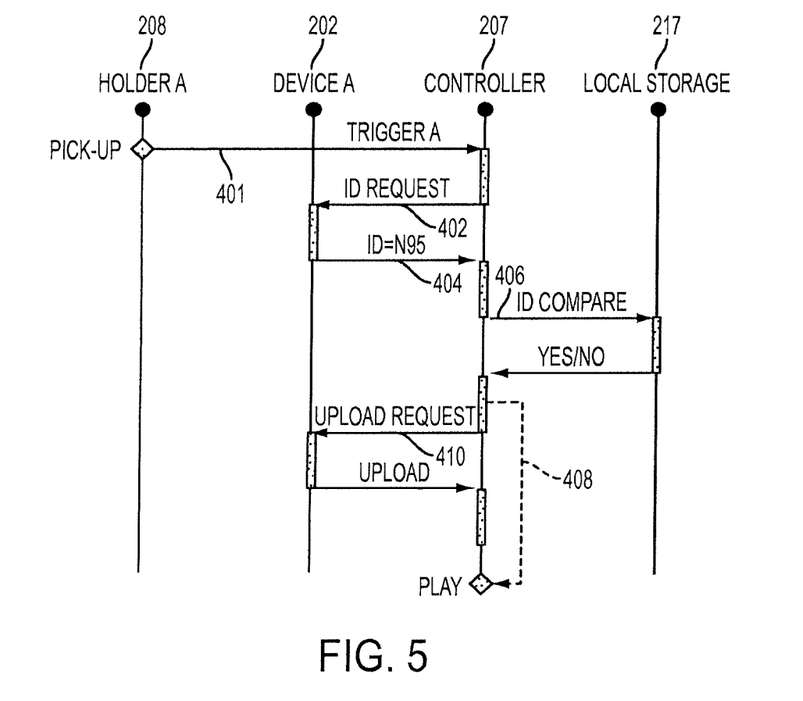
FIG. 5 is a flow diagram for the stand-alone kiosk according to example embodiments.

FIG. 5 is a diagram illustrating an example sequence of operations for the stand alone kiosk 200 which may not be connected to a server.

According to example embodiments, a promotional kiosk 200 may operate in standalone mode. As an example, promotional material 135 may be preloaded to an electronic device 202 and communication between electronic device 202 and controller 207 may be established. In 401, when the electronic device 202 is lifted from the holder 208, the sensor 211 may trigger a request for an electronic device ID 131. In 402, the electronic device 202 is requested and at 404 the electronic device 202 may send its ID 131. In 406, the controller 207 may check whether the device ID 131 is present in its own cache or local storage 217 and/or check the version of promotional material 135 in its own cache or local storage 217, and at 408 play the promotional material 135 if the device ID 131 is present and (as the case may be) version of the promotional material is correct (Yes at 406) or if not (No at 406) in 410 may download and play the promotional material 135 or (as the case may be) the correct version from the electronic device 202.

According to example embodiments, matching promotional material 135 to the electronic device 102 may include a unique ID 131, 142 assigned to both an electronic device 102 and promotional material 135, respectively, downloading the promotional material 135 identified by the promotional material ID 142 to a content controller 107 and/or a database of the server 119 for output at the kiosk 100 (apparatus 101) and storing the target device and promotional material IDs 131, 142 in an electronic device. A hardware configuration of the kiosk 100 (apparatus 101) and a logical connection of the electronic device 102 to the controller 107 may ensure a proper match via the IDs 131, 142 independently from the kiosk 100 (apparatus 101), cradle 114, holder 108, and device 102 permutation. If the promotional material 135 changes for the same electronic device 102 and/or the electronic device 102 is changed at the kiosk 100 (apparatus 101), the change may also occur on the server 119 and the latest promotional material 135 for a electronic device 102 may be output (e.g., played) automatically.

According to example embodiments matching promotional material 135 to an electronic device 102 may include a unique ID 131, 142 assigned to both an electronic device 102 and promotional material 135, and downloading the promotional material 135 to the electronic device 102 by way of the electronic device and promotional material IDs 131, 142. The hardware configuration of the kiosk 100 and logical connection of the electronic device 102 to controller 107 may ensure a proper match via the IDs 131, 142 independently from the kiosk 100, cradle 114, holder 108, and device 102 permutation.

A method of providing information related to an identifiable device tethered to an apparatus, includes configuring a computer to: detect an event in connection with presence of the identifiable device, obtain an identifier (ID) of the identifiable device in response to the event, and providing information related to the identifiable device and correlated with the obtained target device ID of the identifiable device. The foregoing and/or other aspects are achieved by providing a method including receiving, by a processor, a device pickup event from a holder holding a device to be promoted connected to the processor via universal serial bus, the device pickup event indicating that the device is removed from the holder, transmitting upon the device pickup event, by the processor, an identification request to the device, receiving by the processor, a first identification of the device in response to the identification request, comparing, by the processor, the first identification of the device with a second identification of the device stored in a storage, requesting, by the processor, second promotional information from a server if the first identification of the device differs from the second identification of the device and playing, by the processor, first promotional information if the first identification of the device matches the second identification of the device and playing second promotional information if the first identification of the device does not match the second identification of the device.

According to an aspect of an embodiment, a kiosk includes a computer implemented content controller; a body assembly housing a plurality of holder with cradles attached to the kiosk by a connector, the connector including a communication link to the computer implemented content controller; and a target device held by the holder and the target device associated with an identifier that uniquely identifies the target device to the content controller, wherein the content controller is configured to execute obtaining the target device identifier, retrieving additional information correlated with the obtained target device identifier; and outputting the additional information. The additional information is output at the kiosk and/or to another device, for example a mobile device, remote terminal. The holders holding the promoted devices are individually identifiable as position information by the content controller of the kiosk by a data communication connection, for example an electrical connection from the content controller to the holders.

The foregoing and/or other aspects are further achieved by providing a method, including requesting, by a processor, an identification of a device held in a holder, comparing, by the processor, the identification of the device with a preset value and playing, by the processor, a first promotional information if the identification of the device matches the preset value and playing a second promotion information if the identification of the device fails to match the preset value. The foregoing and/or other aspects are achieved by providing at least one non-transitory computer readable medium including computer readable instructions that control at least one processor to implement methods of one or more embodiments.

Figure 6:
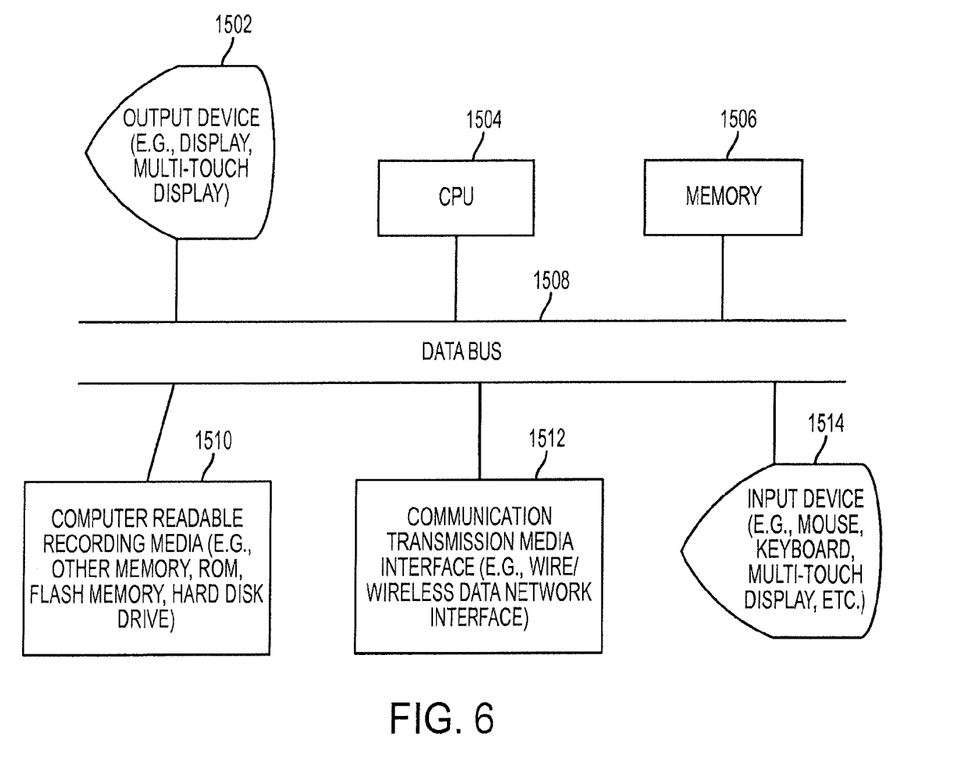
FIG. 6 is functional block diagram of a computer, which is a machine, for implementing embodiments of the present invention.

FIG. 6 is a functional block diagram of a processing device, such as a computer (hardware computing/processing machine) for the embodiments of the invention, namely a computer configured to execute functions of the content controllers 107, 119, 207, and a target processing device 102. In FIG. 6, the computer can be any computing device that can execute instructions to provide the described functions. Typically, the computer includes an input device 1514 (for example, a mouse, keyboard, multi-touch display screen, etc.), output device 1502 (for example, a display to display a user interface or output information, printer, etc). One or more computer controller(s) or processing cores 1504 (e.g., a hardware central processing unit) executes instructions (e.g., a computer program or software) that control the apparatus to perform operations. According to an aspect of an embodiment, one or more networked computer servers, each with a number of processing cores, execute the described operations.

Typically, a memory component 1506 stores the instructions for execution by the controller 1504. According to an aspect of an embodiment, the apparatus reads/writes/processes data of any computer readable recording or storage media 1510 and/or communication transmission media interface 1512. The communication transmission media interface is to data network with one or other machines (e.g., computers, a distributed network) to execute the described functions. The embodiments can be implemented via grid computing. The display 1502, the CPU 1504 (e.g., hardware logic circuitry based computer processor that processes instructions, namely software), the memory 1506, the computer readable media 1510, and the communication transmission media interface 1512 are in communication by one or more the data bus(es) 1508.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. According to an aspect of an embodiment, the described features, functions, operations, and/or benefits can be implemented by and/or use computing hardware and/or software. For example, the content controller 107, which is a machine, communicably connects to a tethered processing device, which is a machine, such as a client terminal, mobile (phone) device, tablet computer, and the content controller 107 and tethered processing device each can comprise a computing controller (CPU) (e.g., a hardware logic circuitry based computer processor that processes or executes instructions, namely software/program), computer readable media, transmission communication interface (network interface), input device, and/or an output device, for example, a display device, and which can be in communication among each other through one or more data communication buses. In addition, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A kiosk, comprising:
a holder to hold a device identifiable by an identifier (ID) that uniquely identifies the device, the device ID retrievable from the device through an application interface executing on the device and the holder identifiable as physical location information in a geographic and/or area location for the device;
at least one memory that stores instructions;
at least one hardware data communication interface; and
at least one hardware processor coupled to the memory and to the at least one hardware data communication interface to cause, including by executing the instructions, the following operations to be performed:
obtain the device ID by communicationally interfacing over the at least one hardware data communication interface with the application interface executing on the device to request the ID of the device, in response to a presence event detected in connection with presence of the device determined based upon the holder, and
trigger retrieving information related to the device influenced by the device ID and the holder, in response to the presence event determined based upon the holder,
the retrieved information related to the device determined according to a combination of the device ID obtained from the device and the holder indicative of the physical location information in the geographic and/or area location for the device for output to a mobile device communicationally linked over the at least one hardware data communication interface.

2. The kiosk of claim 1, wherein the kiosk further comprises a display device, and the information related to the device is to be output at the display device of the kiosk.

3. The kiosk of claim 1, wherein
the holder includes a sensor to detect the presence event in connection with the presence of the device, and
in response to the detected presence event, the at least one hardware processor obtains the device ID.

4. The kiosk of claim 3, wherein the presence event is one or more of lifting of the device, a person approaching the device, or receipt of a command signal from another device.

5. The kiosk of claim 3, wherein
in response to an initial obtainment of the device ID, the at least one hardware processor stores in the at least one memory information indicating a correspondence of the holder to the obtained device ID of the device held by the holder, and
in response to a subsequent presence event of same device held by the holder, the at least one hardware processor obtains the device ID from the information indicating the correspondence.

6. The kiosk of claim 3, wherein
a memory among the at least one memory, a hardware processor among the at least one hardware processor and a hardware data communication interface among the at least one hardware data communication interfaces are included with the holder to store in the memory, in response to the initial obtainment of the device ID, the information indicating the correspondence of the holder to the obtained device ID of the device held by the holder,
the hardware processor of the holder causes a device ID reset in the memory of the holder in response to a new device being held by the holder by obtaining a new device ID of the new device and storing the new device ID in the memory of the holder for the subsequent presence event of the new device.

7. The kiosk of claim 1, wherein the at least one hardware processor retrieves the information related to the device in response to the presence event from a server and/or the device, through the at least one hardware data communication interface.

8. The kiosk of claim 1, wherein the at least one hardware processor retrieves the information related to the device in response to the presence event from the at least one memory and/or from the device.

9. The kiosk of claim 1, wherein the hardware data communication interface establishes a communication link which is a wire and/or wireless communication link to the device and/or a server.

10. A method of providing information related to an identifiable device tethered to an apparatus, comprising:
executing by a computer to:
detect a presence event in connection with presence of the identifiable device in a tether identifiable as physical location information in a geographic and/or location area for the identifiable device, interface, over a communication link to the identifiable device, with an application interface executing on the identifiable device to request an identifier (ID) of the identifiable device through the application interface, in response to the presence event determined based upon the tether, obtain the ID of the identifiable device requested from the identifiable device through the application interface, and trigger retrieval of information related to the identifiable device influenced by the device ID and the tether, in response to the presence event, the retrieved information related to the identifiable device determined according to a combination of the identifiable device ID obtained from the identifiable device and the tether indicative of the physical location information in the geographic and/or location area for the identifiable device, for output to a mobile device communicationally linked to the computer and/or for output to a display device.

11. The method according to claim 10, further comprising:

by at least one hardware processor for the tether of the identifiable device, obtaining from the identifiable device, the identifiable device ID through the application interface over the communication link to the identifiable device, and transmitting the obtained identifiable device ID to the computer for retrieving the information, in response to the presence event.

12. A kiosk configured to tether a target device, the kiosk comprising:

a content processing device configured to perform:
identifying the kiosk as physical location information in a geographic and/or location area for the target device, in response to a presence event in connection with presence of the target device at the identified kiosk, obtaining an identifier (ID) of the target device by interfacing with an application interface executing on the target device over a communication link between the target device and the content processing device to request the ID of the target device, and triggering retrieving information related to the target device influenced by the device ID and the identified kiosk in response to the presence event, the retrieved information related to the target device determined according to a combination of the target device ID obtained from the target device and the identified kiosk indicative of the physical location information in the geographic and/or location area for the target device, for output to a mobile device communicationally linked to the content processing device and/or for output to a display device of the kiosk.

13. The kiosk according to claim 12, wherein the presence event is a user profile based event and the information is related to the target device and according to the user profile.

14. The kiosk according to claim 1, wherein
the holder is identifiable by a position ID indicative of the physical location information in the geographic and/or area location for the device,
the at least one hardware processor generates a key which is a combination of the device ID, the position ID for the holder, and information ID associated with the information related to the device,
the retrieved information related to the device determined based upon the key.

15. The method according to claim 10, wherein
the tether is identifiable by a position ID to indicative of the physical location information in the geographic and/or area location for the identifiable device,
the computer further executes to generate a key which is a combination of the identifiable device ID, the position ID for the tether, and information ID associated with the information related to the identifiable device,
the information related to the identifiable device determined based upon the key.

16. The kiosk according to claim 12, further comprising a tether to tether the target device, wherein
the tether is identifiable by a position ID as the physical location information in the geographic and/or area location for the device,
the content processing device is configured to generate a key which is a combination of the target device ID, the position ID for the tether, and information ID associated with the information related to the target device,
the information related to the target device determined based upon the key.

* * * * *